H. B. JOHNSTON.
PISTON AND CONNECTING ROD.
APPLICATION FILED JUNE 22, 1920.

1,419,736.

Patented June 13, 1922.

INVENTOR
*Harry B. Johnston*
BY
*Walter W. Burns*
ATTORNEY

UNITED STATES PATENT OFFICE.

HARRY B. JOHNSTON, OF SEATTLE, WASHINGTON.

PISTON AND CONNECTING ROD.

1,419,736.  Specification of Letters Patent.  Patented June 13, 1922.

Application filed June 22, 1920. Serial No. 390,979.

*To all whom it may concern:*

Be it known that I, HARRY B. JOHNSTON, a citizen of the United States, residing at Seattle, in the county of King and State of Washington, have invented certain new and useful Improvements in Pistons and Connecting Rods, of which the following is a specification.

My invention relates to pistons, metallic piston rings, connecting rods and to wrist connections between pistons and connecting rods and particularly to those types of fluid pressure devices wherein a connecting rod has a connection to a piston whereby its outer end may be moved with relation to the piston, such as when the outer end is connected to a crank shaft.

One of the objects of my invention is the provision of an arrangement of a connection between a connecting rod and a piston and an arrangement of the piston ring on the latter whereby the center of the connection will lie in a plane passing substantially through the outer cylinder contacting surface of the piston ring.

Another object of my invention is the provision of a connection between a connecting rod and a piston whereby the center of the connection between the rod and piston will be very near to the working surface or head of the piston, thereby permitting of a shorter and lighter piston than is possible in the ordinary type where the wrist pin extends through the cylindrical wall of the piston and the rings are located thereabove.

Another and further object of my invention is the provision of such a connection between the piston and connecting rod that will permit of an universal movement of the rod with relation to the piston.

Another and still further object of my invention is the provision of such a connection between a piston and connecting rod which will permit of a turning of the piston on its axis within the cylinder and with relation to the connecting rod.

Referring to the drawings wherein an embodiment of my invention is set forth:

Like reference characters refer to similar parts throughout the several figures of the drawings.

Figure 1:
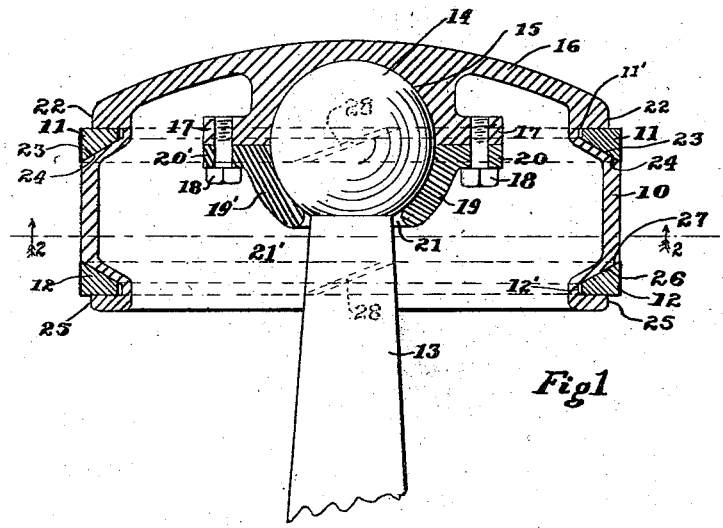
Figure 1 is a cross section of the piston on the line 1—1 of Figure 2, showing the connection of the connecting rod to the piston.
Figure 2:
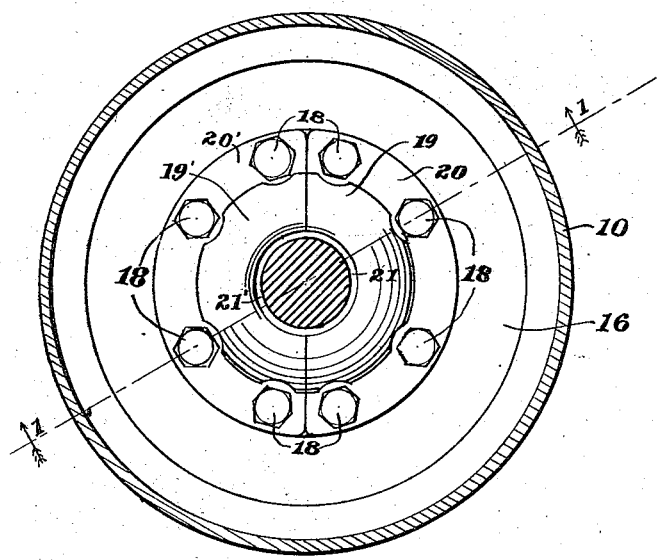
Figure 2 is a cross section taken on the line 2—2 of Figure 1, in the direction of the arrow.
Figure 3:
Figure 3 is a detail of one of the connecting rod ball securing members.

10 designates the cylindrical shell of the piston, 11 the upper metallic piston ring, 12 the lower metallic piston ring, and 13 the connecting rod which may be connected to the crank shaft (not shown). At the top of the connecting rod 13 is provided a ball, 14, which engages a hemispherical bearing 15 on the inner side of the closed end or head, 16, of the piston. The outer wall of the bearing, 15, is provided with a flange, 17, which extends around the bearing and provides for securing means as the bolts, 18, which may be threaded therein. Opposite the bearing 15, and securing the ball, 14, within the bearing, 15, are provided two connecting-rod ball securing members, 19 and $19^1$ (see Figure 2). These members, 19 and $19^1$, are provided with flanges, 20 and $20^1$, respectively, which together are complementary to the flange 17 adjacent the bearing 15. The members 19 and $19^1$, are held in place by the bolts 18. While these members 19 and $19^1$ hold the ball 14 in place, they are cut away at 21 and $21^1$, respectively, to provide for movement of the connecting rod with relation to the piston.

The outer periphery of the head 16 of the piston is cut away as at 22 to more readily permit the fluid under pressure to reach the ring 11. The ring 11 is provided with a lower inclined or conical surface 23, which contacts with a similar inclined or cone shaped wall, 24, of the groove. At the rear of the rings, 11 and 12, are provided carbon spaces, $11^1$ and $12^1$, respectively. The lower edge of the piston is cut away as at 25 to permit the fluid pressure below the piston to more readily reach the ring 12. The ring 12 is provided with an inclined or conical surface, 26, similar to the surface, 23, of the ring, 11, and the lower groove is provided with a co-operating inclined wall, 27.

Figure 4:
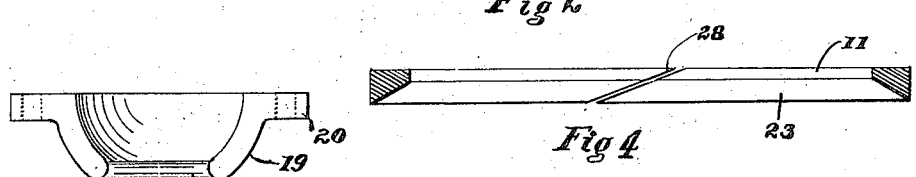
Figure 4 is a cross section of the upper ring when detached from its seat.

The ring, 11, which is shown detached and in cross section in Figure 4, is provided with a split such as at 28. The particular shape of split, however, forms no part of this invention and may be made in any suitable or well known manner.

It is to be noted that the wrist connection and ring are placed so that the center of the ball is in a plane which passes through that surface of the ring, 11, which contacts with the cylinder wall.

I will now describe the operation of my invention as applied, for example, to an internal combustion motor of the four-cycle type.

When the explosion takes place, the gas under pressure immediately passes between the cylinder wall and cut away portion 22 and contacts with the ring 11. The ring, 11, being along the conical or inclined wall 24 of the groove and against the cylinder wall. This wedging action has two effects, first it effectively seals the passage between the piston and its cylinder and second, it has a tendency to hold the piston away from the wall of the cylinder. This latter action is due to the forcing of the cone shaped surface 23 down on the cone shaped wall 24 of the groove, the ring being meanwhile restrained by the wall of the cylinder.

In the ordinary piston and rod construction the rings are held outwardly only by their own resiliency, and there is no tendency of the ring to hold the piston away from the cylinder wall. The result is, that as the explosion occurs, the piston is forced to one side, due to the angularity of the connecting rod with relation to the axis of the piston as the crank end of the piston follows its path. The piston, being necessarily smaller than the cylinder, comes in contact therewith at a line along the side thereof. As the piston moves, wearing takes place along the line of contact, with the result that the cylinder is soon out of round. With my invention, the ring contacts harder with the cylinder than the ring in the usual type of piston and distributes the wear all around the cylinder, instead of in one line.

If the ring 11 is positioned above the center of the connecting rod ball, the tendency is to hold the upper portion of the piston in the center of the cylinder. If the ring 11 is positioned below the center of the connecting rod ball, the tendency is to hold the lower portion of the piston in the center of the cylinder. If the ring is placed so that its cylinder wall contacting surface is cut by a plane containing the center of the connecting rod ball and perpendicular to the piston axis then the tendency is to hold the whole piston centered in the cylinder.

The placing of the ring, so that it is cut by the plane perpendicular to the piston axis at the center of the wrist connection, is made possible by not having the wrist connection extend through the cylindrical wall of the piston, as it does in the usual piston construction.

During the intake stroke the lower ring 12 operates in a similar manner to the above described operation of the ring 11 except that the ring 12 does not tend to hold the whole piston centered. This, however, is not necessary since the difference in atmospheric pressure below and the intake pressure above the piston is not great. It is, however, great enough to cause the lower ring 12 to make a tight seal between the piston and cylinder wall.

It will thus be clear that with my invention, it is possible to make a very light, short piston, having the connecting rod bearing close to the head wall of the piston.

It will also be clear that with my invention the "slapping" of the piston which, in the usual type of piston, causes cylinders and pistons to wear out of round, is reduced to a minimum, due to the co-action between the cone surfaces and the position of the center of the bearing.

Furthermore, the universal feature of the piston and rod connection permits the piston to freely turn within the cylinder and thus cause a distribution of the wear on the piston and rings throughout their entire cylindrical surfaces.

While I have described one form of my invention in detail, I desire to have it understood that it is adaptable for use in the other types of fluid pressure engines and that various modifications and changes may be made without departing from the spirit of my invention and within the scope of the appended claims.

While I have described my invention in connection with a connecting rod, I desire to have it understood that very advantageous results can be obtained by the use of my invention and a connecting rod in place of the rigid piston rod now so commonly used in some types of engines.

Having described my invention, what I claim is—

1. A piston having a piston ring groove and a wrist connection bearing, the groove having an inclined wall, the center of the connection bearing being substantially in the same axially perpendicular plane as the groove.

2. In combination, a connecting rod, a piston having a groove with an inclined wall, a ring having a surface for cooperating with the inclined wall and being in the groove, and a pivotal connection between the connecting rod and piston, the center of which lies substantially in a plane perpendicular to the axis of the piston and passing through the piston ring.

3. In combination, a connecting rod, a piston having a ring groove, a ring in the groove, and an universal pivotal connection between the connecting rod and piston, the center of which lies substantially in a plane perpendicular to the axis of the piston and passing through the piston ring.

4. In combination a connecting rod, a piston having a groove with an inclined wall, a ring having a surface for cooperating with the inclined wall and being in the groove, and an universal pivotal connection between the connecting rod and piston the center of which lies substantially in a plane perpendicular to the axis of the piston and passing through the piston ring.

5. In combination, a connecting rod, a piston having a groove with an inclined wall, a ring having a surface for cooperating with the inclined wall and being in a groove, and a ball and socket connection between the connecting rod and piston, the center of which lies substantially in a plane perpendicular to the axis of the piston and passing through the piston ring.

In testimony whereof I affix my signature.

HARRY B. JOHNSTON.